(12) United States Patent
Reynolds

(10) Patent No.: US 12,140,203 B2
(45) Date of Patent: Nov. 12, 2024

(54) CARRIAGES AND CLAMPING DEVICES

(71) Applicant: GRIPPLE LIMITED, Sheffield (GB)

(72) Inventor: Thomas Reynolds, Sheffield (GB)

(73) Assignee: GRIPPLE LIMITED (GB)

( * ) Notice: Subject to any disclaimer, the term of this patent is extended or adjusted under 35 U.S.C. 154(b) by 0 days.

(21) Appl. No.: 18/029,577

(22) PCT Filed: Oct. 27, 2021

(86) PCT No.: PCT/IB2021/059912
§ 371 (c)(1),
(2) Date: Mar. 30, 2023

(87) PCT Pub. No.: WO2022/096987
PCT Pub. Date: May 12, 2022

(65) Prior Publication Data
US 2023/0375071 A1    Nov. 23, 2023

(30) Foreign Application Priority Data

Nov. 4, 2020  (GB) ..................................... 2017428
Oct. 26, 2021 (GB) ..................................... 2115385

(51) Int. Cl.
*F16G 11/02*   (2006.01)
*F16G 11/10*   (2006.01)

(52) U.S. Cl.
CPC ............ *F16G 11/02* (2013.01); *F16G 11/106* (2013.01)

(58) Field of Classification Search
CPC .... F16G 11/02; F16G 11/106; F16B 37/0857; B25B 5/14; B25B 5/163
See application file for complete search history.

(56) References Cited

U.S. PATENT DOCUMENTS

| | | | | | |
|---|---|---|---|---|---|
| 4,416,503 | A | * | 11/1983 | Hayes | F16G 11/02 439/469 |
| 4,872,626 | A | * | 10/1989 | Lienart | H02G 7/056 174/40 R |
| 5,127,915 | A | * | 7/1992 | Mattson | A61B 17/122 606/120 |
| 5,257,768 | A | * | 11/1993 | Juenemann | F16L 55/035 248/68.1 |
| 5,289,613 | A | * | 3/1994 | Kohl | F16G 11/02 16/108 |
| 5,323,674 | A | * | 6/1994 | Fidkowski | B25B 13/48 81/487 |
| 5,669,590 | A | * | 9/1997 | Przewodek | F16L 3/1075 248/74.1 |
| 5,921,991 | A | * | 7/1999 | Whitehead | A61B 17/122 606/119 |

(Continued)

FOREIGN PATENT DOCUMENTS

EP   1770305 A1   4/2007
EP   3783235 A1   2/2021

*Primary Examiner* — David M Upchurch
(74) *Attorney, Agent, or Firm* — Clark Hill PLC; James R. Foley (57) ABSTRACT

A carriage for holding a clamping member in a clamping device, the carriage having a central portion and at least one holding portion for holding the clamping member, wherein the, or each, holding portion is foldable relative to the central portion between an open position of the, or each, holding portion and a closed position of the, or each, holding portion.

18 Claims, 7 Drawing Sheets

(56) References Cited

U.S. PATENT DOCUMENTS

| | | | | |
|---|---|---|---|---|
| 8,910,912 B2* | 12/2014 | Child | ................... | F16L 55/035 |
| | | | | 248/68.1 |
| 9,382,757 B1 | 7/2016 | Kirk et al. | | |
| 9,954,307 B2* | 4/2018 | Tait | ...................... | H01R 13/506 |
| 2002/0001504 A1 | 1/2002 | McCallion | | |
| 2017/0194781 A1* | 7/2017 | Bentley | .................. | H02G 7/125 |
| 2019/0137008 A1* | 5/2019 | Peterson | ............... | F16L 3/2235 |
| 2019/0383431 A1* | 12/2019 | Magagna | ................ | F16L 33/06 |
| 2020/0124212 A1* | 4/2020 | Lim | ...................... | F16L 23/167 |
| 2022/0268383 A1* | 8/2022 | White | ....................... | F16B 2/18 |

* cited by examiner

CARRIAGES AND CLAMPING DEVICES

This application is a National Phase Filing of PCT/IB2021/059912, having an International filing date of Oct. 27, 2021, which claims priority of GB 2017428.0, filed Nov. 4, 2020, and GB 2115385.3, filed Oct. 26, 2021. The disclosure of the foregoing are hereby incorporated by reference.

This invention relates to carriages for use in clamping devices. This invention also relates to clamping devices incorporating carriage arrangements.

It is known to provide carriages to hold wedges in clamping devices for clamping elongate articles, such as cables, wire ropes, wires or the like. However, it can be difficult to ensure that the wedges are properly installed in the clamping device when using such carriages. For example, there can be problems concerning misalignment of the wedges, or the wedges falling out of the carriage while being installed, or even during use.

According to a general aspect of this invention, there is provided a carriage for holding a clamping member in a clamping device, the carriage comprising a central portion and at least one holding portion for holding the clamping member, wherein the, or each, holding portion is foldable relative to the central portion between an open position of the, or each, holding portion and a closed position of the, or each, holding portion.

According to a first aspect of this invention, there is provided a carriage for holding a plurality of clamping members in a clamping device, the carriage comprising a central portion and a plurality of holding portions for holding the clamping members, wherein the holding portions are foldable relative to the central portion between an open position of the holding portions and a closed position of the holding portions.

According to a second aspect of this invention, there is provided a clamping device comprising a carriage as described above, a plurality of clamping members, each clamping member being held in a respective one of the holding portions, a housing in which the carriage is housed when the holding portions are in the closed position, and an urging arrangement for urging the carriage along the housing.

The clamping device may be for clamping an elongate article, such as a cable, wire rope, wire or the like.

In the open position, the holding portions may extend radially outwardly from the central portion. In the closed position, the holding portions may extend over the central portion.

The central portion may define an aperture through which an elongate article may extend. In the closed position, the holding portions may define a central path therebetween for receiving the elongate article therethrough. The central path may be aligned with the aperture in the central portion.

The carriage may have a main axis, which may extend through the central path and the aperture in the central portion.

The holding portions may be attached to the central portion by respective hinges. Each hinge may comprise a flexure bearing. Each hinge may comprise a living hinge.

Each holding portion may define a holding space in which the respective clamping member can be received. Each holding space may be elongate.

Each clamping member to be received in a respective holding space may be elongate. Each clamping member may comprise a wedge.

Each holding portion may have opposed side wall formations to define the holding space. The holding space may be defined between the side wall formations.

Each holding portion may have retaining formations to retain the clamping member in the holding space.

The retaining formations of each holding portion may comprise a hook formation for hooking over the clamping member. The retaining formations of each holding portion may further include a resilient element to engage the clamping member and press the clamping member onto the hook formation.

The hook formation may be provided at a first end of the holding space. The resilient element may be provided at an opposite second end of the holding space. Thus, each clamping member is held in the respective holding space between the hook formation and the resilient element.

Each holding portion may define an insertion opening through which the clamping member can be inserted into the holding space.

When the clamping member is in the holding space, a clamping surface of the clamping member may face outwardly through the insertion opening. Alternatively, the clamping member may project from the holding space through the insertion opening, with the clamping surface facing outwardly.

Each holding portion may include a supporting formation for supporting the clamping member in the holding space. Each holding portion may define a further opening opposite the insertion opening. The supporting formation may extend across the further opening.

The clamping member may have a sliding surface opposite the clamping surface, the sliding surface being slidable along a surface of the clamping device. In use, during clamping of the elongate article, the sliding surface may move along a surface of the clamping device.

The supporting formation may comprise a strip. The supporting formation may be attached to one of the side wall formations. The holding portion may comprise two of the supporting formations. Each supporting formation may be attached to a respective one of the side wall formations.

The, or each, supporting formation may be deformable by the clamping member during clamping of the elongate article to allow the sliding surface to be clamped against the surface of the clamping device.

The carriage may comprise a seat formation on which a spring member may be seated. The seat formation may extend around the aperture in the central portion. The seat formation may be annular. The seat formation may project from the central portion.

The carriage may comprise three of the holding portions. The holding portions may be substantially equispaced around the central portion. The clamping device may comprise three of the clamping members. Each clamping member may be held in a respective holding portion.

The housing may define a through passage along which the elongate article may extend. The carriage and the urging arrangement may be disposed in the passage.

The housing may have an internal surface defining the through passage. The internal surface may taper from a wider regions of the through passage to a narrower region of the through passage. The urging arrangement may urge the carriage along the through passage from the wider region of the passage to the narrower region of the passage.

The urging of the carriage from the wider region to the narrower region of the through passage may push the clamping members inwardly towards each other.

Pushing the clamping members towards each other may push the clamping members into clamping engagement with the elongate article.

The urging of the carriage along the through passage may cause the clamping members to slide along the internal surface of the housing. Thus, the clamping members are pushed inwardly towards each other as the clamping members slide along the surface defining the through passage.

The urging arrangement may comprise a spring member and a reaction member to apply a reaction force to the spring member. The spring member may be a spring, such as a coil spring.

The reaction member may be secured to the housing. The reaction member may comprise a securing portion. The housing may have a cooperating formation to cooperate with the securing portion, thereby securing the reaction member to the housing.

The reaction member may be resiliently deformable to allow the securing portion to cooperate with the cooperating formation. The securing portion may be resiliently deformable to allow the securing portion to cooperate with the cooperating formation.

The reaction member may comprise an inner portion. The securing portion may extend from inner portion. The securing portion may extend radially outwardly from the inner portion.

The reaction member may comprise a plurality of the securing portions. The cooperating formation may cooperate with each of the securing portions. Each securing portion may be resiliently deformable to allow the securing portions to cooperate with the cooperating formation.

Each securing portion may extend from the inner portion. Each securing portion may extend radially outwardly from the inner portion. The plurality of securing portions may be arranged circumferentially around the inner portion.

The inner portion may define a hole through which the elongate article can extend. The reaction member may comprise a locating formation on which the spring member may be located. The locating formation may project from the inner portion.

The locating formation may extend around the hole in the reaction member. The locating formation may be annular.

The spring member may extend between the seat formation of the carriage and the locating formation of the reaction member.

The cooperating formation may comprise a recess defined by the housing to receive the securing portion, thereby securing the reaction member to the housing. The recess may be defined adjacent the wider region of the passage. The recess may be defined in the internal surface of the housing.

The recess may be a groove extending around the housing. The recess may receive each of the securing portions to secure the reaction member to the housing. When so secured, the reaction member can apply the reaction force to the spring member to allow the spring member to urge the carriage along the passage.

The housing may comprise a body portion and an outwardly extending lip portion on the body portion. The body portion may define the passage. The lip portion may extend radially outwardly from the body portion.

The lip portion may be provided on the body portion at the wider region of the passage. The lip portion may support an article on the clamping device or may support the clamping device on an article.

An embodiment of the invention will now be described by way of example only, with reference to the accompanying drawings, in which.

Figure 9:
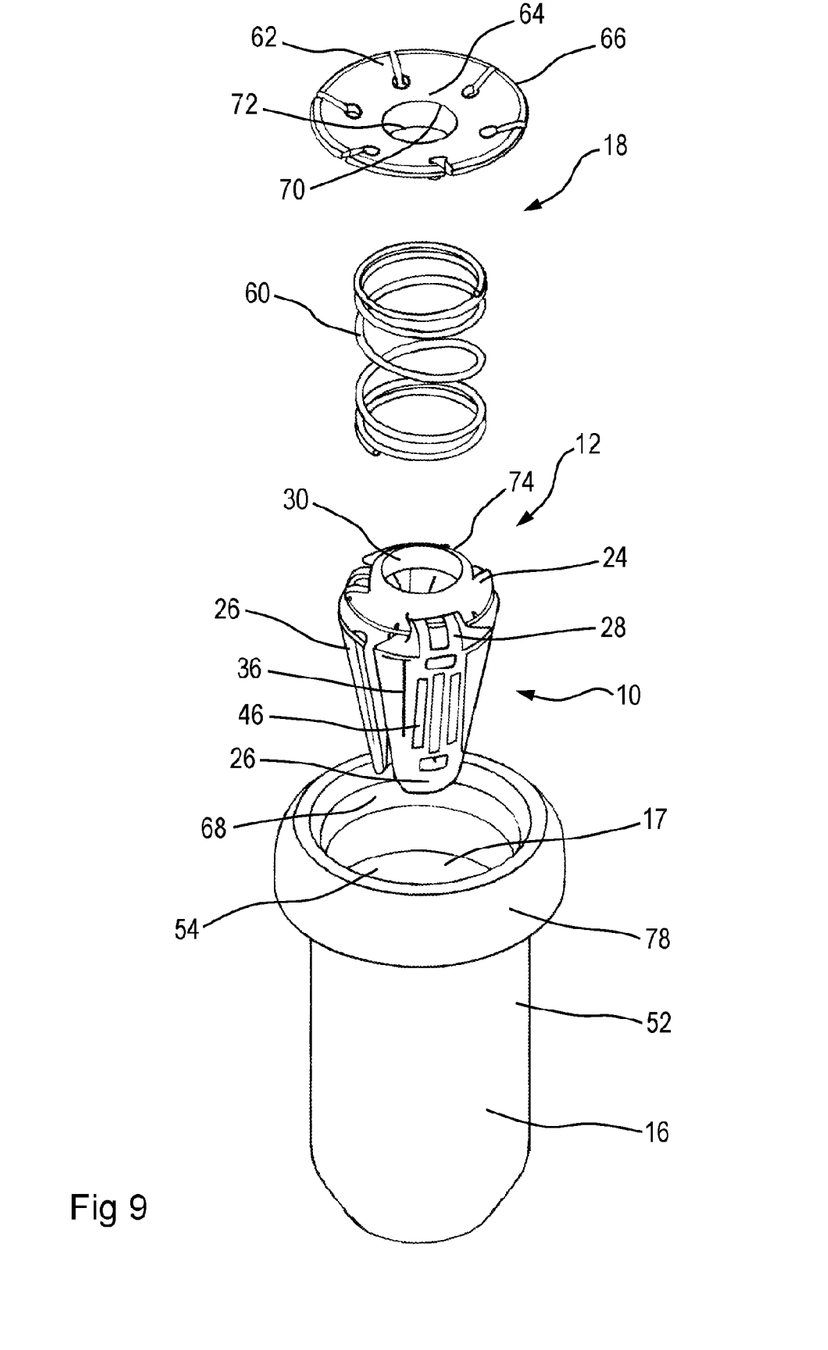
FIG. 9 is an exploded view of a clamping device incorporating the carriage.
Figure 10:
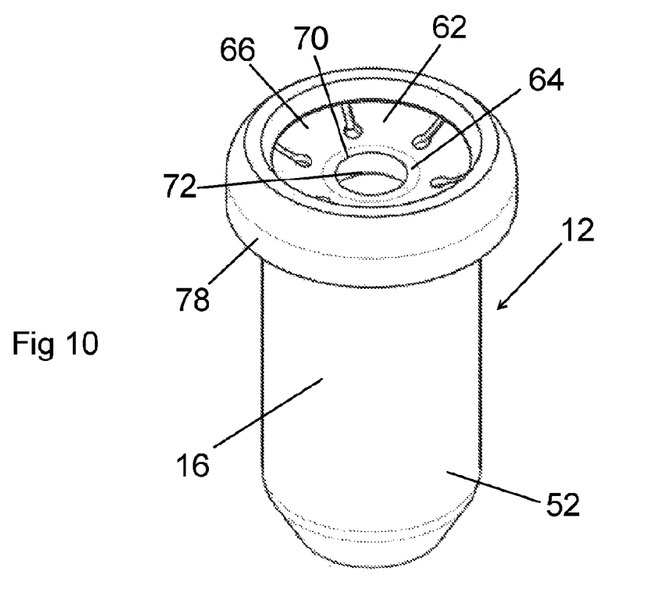
FIG. 10 is a perspective view of the assembled clamping device.
Figure 11:
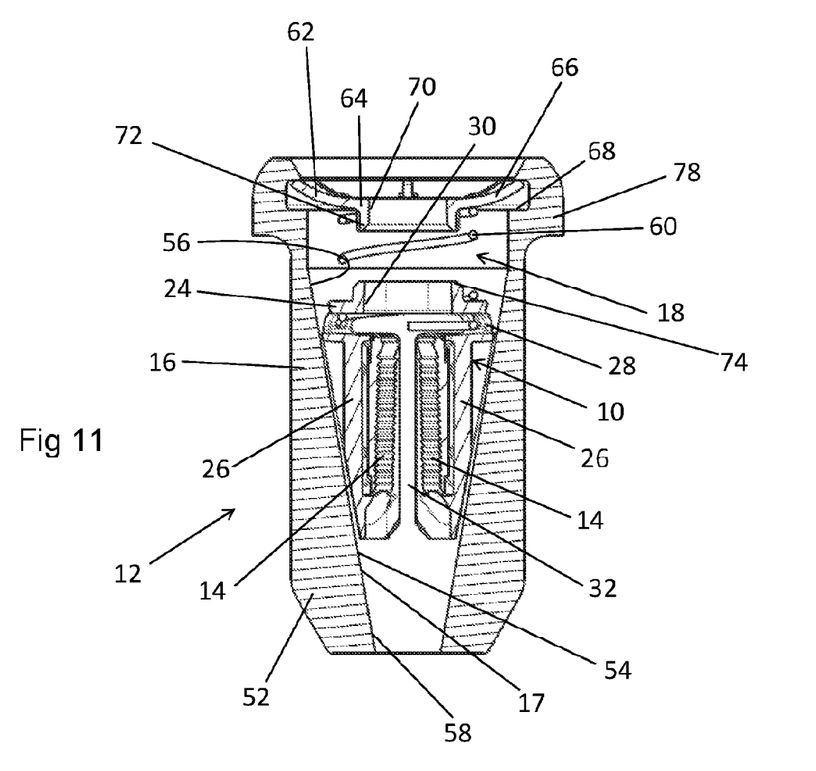
FIG. 11 is a sectional view of the clamping device shown in FIG. 10.

FIGS. 1 to 7 show a carriage 10 for use as part of a clamping device 12. The clamping device 12 is shown in FIGS. 8 to 10, and comprises three clamping members 14 that clamp therebetween an elongate article in the form of a cable, wire rope, wire or the like. The clamping device 12 further includes a housing 16 having an internal surface 17. The carriage 10 is housed in the housing 16. The clamping device 12 further includes an urging arrangement 18 for urging the carriage 10 along the internal surface 17. The construction of the clamping device 12 is discussed in more detail below.

In the embodiment shown, each clamping member 14 is elongate, having a narrower front end region 20 and an opposite wider rear end region 22. Each clamping member 14 is preferably in the form of a wedge, and is urged along the housing 16 with the front end region 20 leading the rear end region 22.

The carriage 10 comprises a central portion 24 and three holding portions 26 extending radially outwardly from the central portion 24. The holding portions 26 are spaced equidistantly from each other around the central portion 24.

Each holding portion 26 is configured to hold a respective one of the clamping members 14. The holding portions 26 are attached to the central portion 24 by hinges 28 in the form of flexure bearings, such as living hinges.

Figure 1:
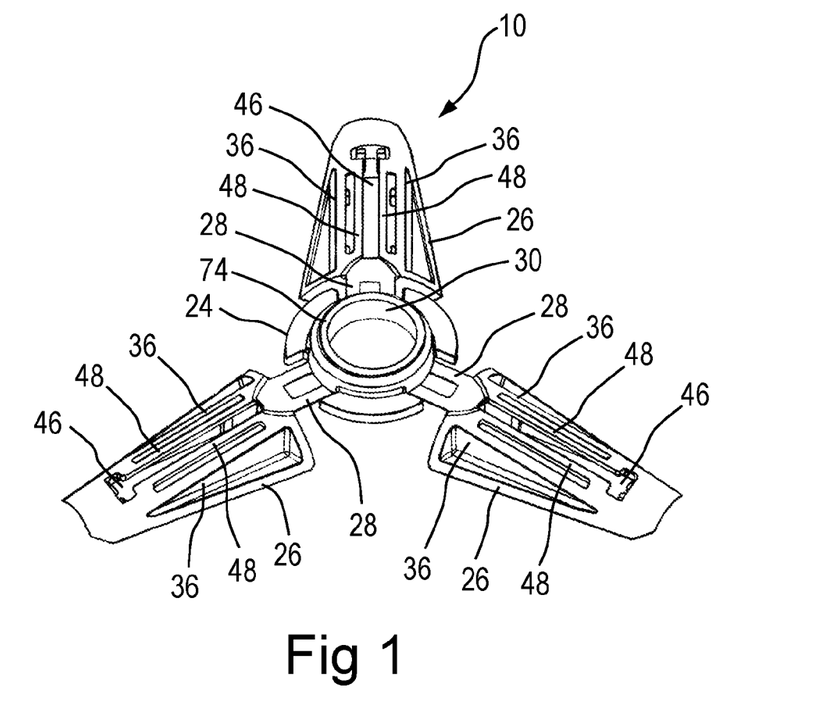
FIG. 1 is a perspective view of a carriage for use in a clamping device, showing holding portions in an open position.
Figure 2:
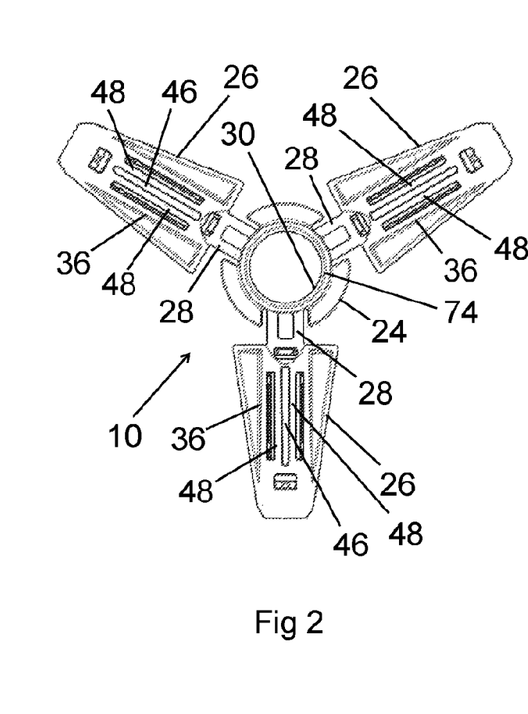
FIG. 2 is a top plan view of the carriage.
Figure 3:
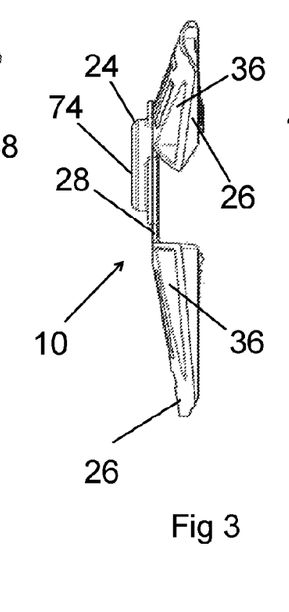
FIG. 3 is a side view of the carriage.
Figure 4:
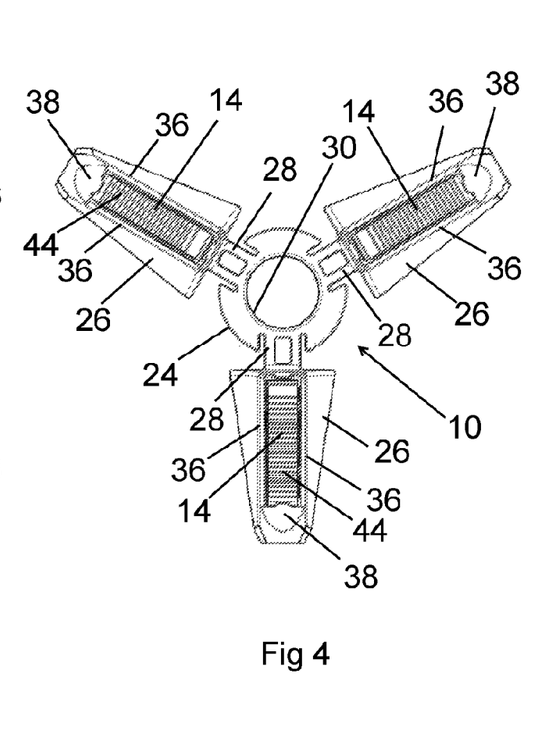
FIG. 4 is a bottom plan view of the carriage.
Figure 5:
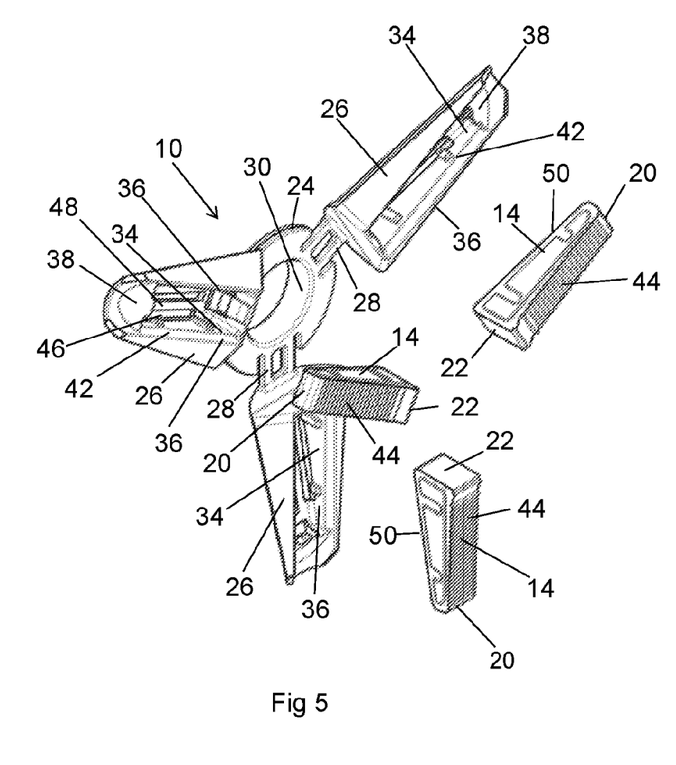
FIG. 5 is an exploded perspective view of the carriage and the clamping members held thereby.
Figure 6:
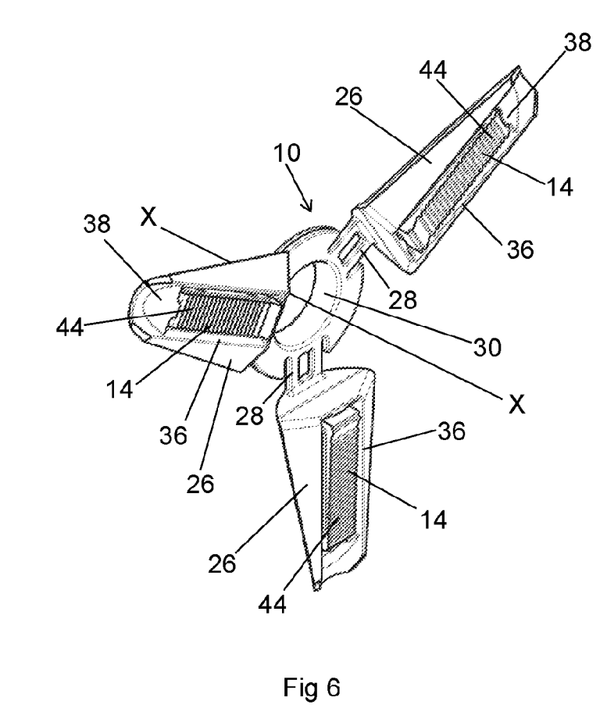
FIG. 6 is a perspective view of the carriage, showing the clamping members held by the carriage.
Figure 7:
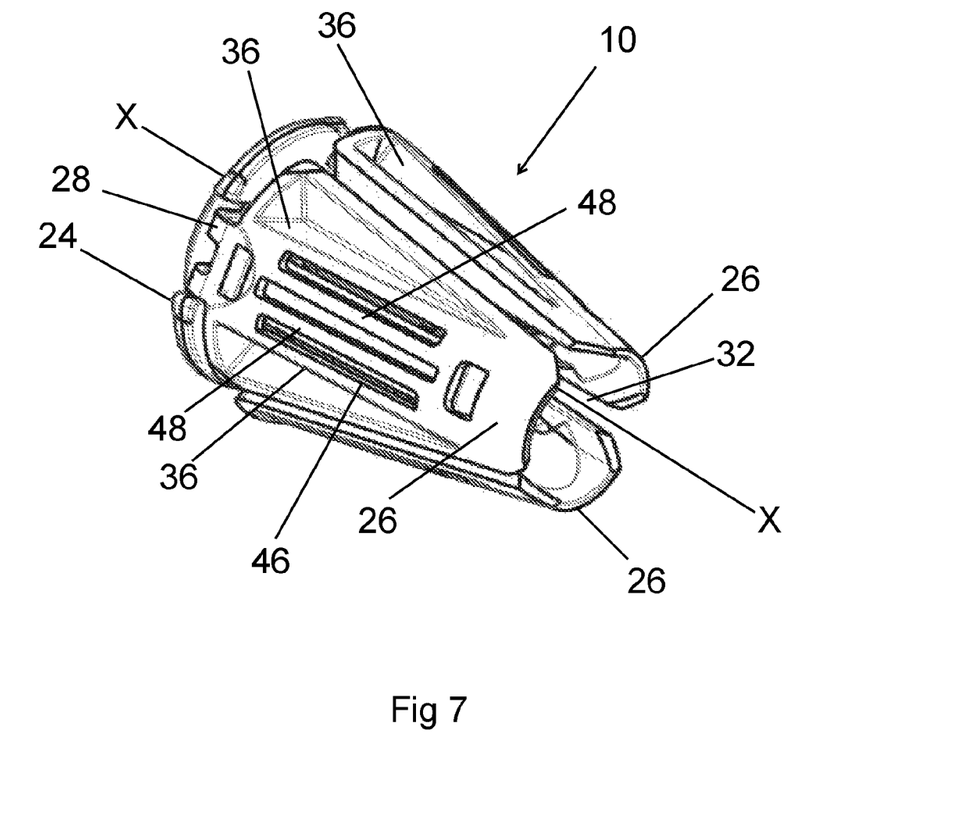
FIG. 7 is a perspective view of a carriage, showing the holding portions in a closed position.
Figure 8:
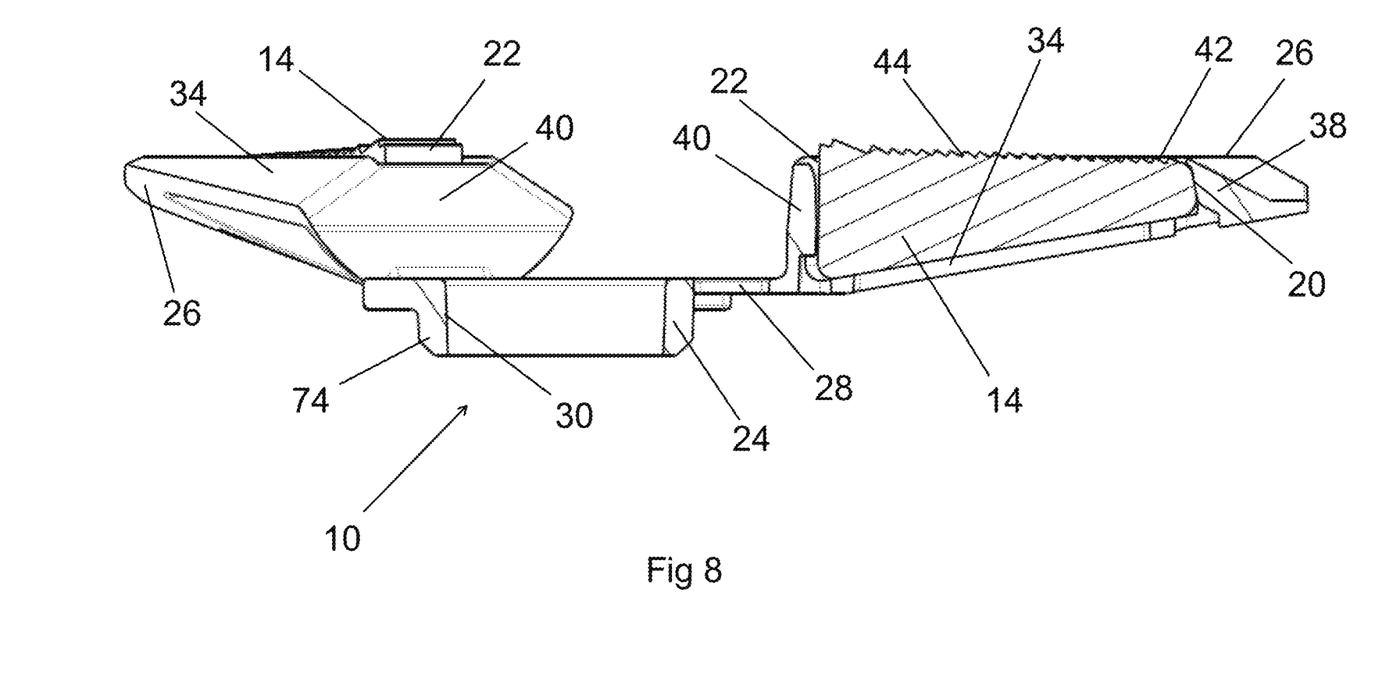
FIG. 8 is a close up sectional view of the carriage.

The hinges 28 allow the holding portions 26 to be foldable relative to the central portion 24 between an open position of the holding portions 26, shown in FIGS. 1 to 6 and 8, and a closed position of the holding portions 26, shown in FIG. 7. In the open position, the holding portions 26 extend radially outwardly from the central portion 24. In the closed position, the holding portions 26 extend over the central portion 24.

The central portion 24 defines an aperture 30 through which the elongate article extends. The carriage 10 has a main axis X-X (see FIGS. 6 and 7) extending through the aperture 30, perpendicular to the central portion 24. In the closed position, the holding portions 26 define a central path 32 therebetween for receiving the elongate article therethrough. The central path 32 is aligned with the aperture 30 in the central portion 24 and extends along the main axis X-X.

Each holding portion 26 defines an elongate holding space 34 (see FIG. 5) in which the respective clamping member 14 is received. Each holding portion 26 has opposed side wall formations 36 defining the holding space 34 therebetween. Retaining formations are provided on the holding portions 26 to retain the clamping member 14 in the holding space 34.

Each retaining formation comprises a hook formation 38 at a free first end region of the respective holding portion 26. Each hook formation 38 hooks over the narrower front end region 20 of the clamping member 14.

The retaining formations further include a respective resilient element 40 at an opposite second end region of the respective holding portion 26. Each resilient element 40 engages the respective clamping member 14 at the wider rear end region 22 of the clamping member 14. The resilient element 40 presses the clamping member 14 onto the hook formation 38 thereby retaining the clamping member 14 in the holding space 34 between the hook formation 38 and the resilient element 40.

Each holding portion 26 defines an insertion opening 42 through which the clamping member 14 can be inserted into the holding space 34. The holding portions 26 are arranged so that, when the holding portions 26 are in their closed position, the insertions opening 42 face inwardly.

Each clamping member 14 has a clamping surface 44 for engaging the elongate article. When each clamping member 14 has been inserted through the respective insertion opening 42, and is retained in the holding space 34, the clamping surface 44 of each clamping member 14 faces through the insertion opening 42. Thus, when the holding portions 26 are in the closed position, the clamping surfaces 44 face towards each other. This allows the clamping members 14 to engage the elongate article when the elongate article is received along the path 32 defined by the holding portions 26 in their closed position.

Each holding portion 26 defines a further opening 46 opposite the insertion opening 42, and has two supporting strips 48 extending lengthwise across the further opening 46. Each supporting strip 48 is attached to a respective one of the wall formations 36. The supporting strips 48 are provided to support the clamping member 14 in the holding space 34 before the carriage 10 is assembled into the housing 16.

Each clamping member 14 has a sliding surface 50 opposite the clamping surface 44, the sliding surface 50 being slidable along the internal surface 17 of the housing 16 during clamping of the elongate article. The sliding surface 50 of each clamping member 14 engages the supporting strips 48 when the clamping members 14 are received in the respective holding spaces 34.

The housing 16 comprises a body portion 52 having the internal surface 17. The internal surface 17 defines a through passage 54 along which the elongate article can extend. The internal surface 17 tapers from a wider region 56 of the through passage 54 to a narrower region 58 of the through passage 54.

The carriage 10 is disposed in the through passage 54 with the holding portions 26 in their closed position. The central portion 24 is arranged at the wider region 56 of the through passage 54, and the holding portions 26 extend from the central portion 24 to the narrower region 58. The elongate article is arranged in the through passage 54, extending along the path 32 defined between the holding portions 26.

The urging arrangement 18 is also disposed within the through passage 54 in a position in which the urging arrangement 18 urges the carriage 10 from the wider region 56 of the through passage 54 to the narrower region 58 of the through passage 54. When so urged, the sliding surface 50 of each clamping member 14 slides along the internal surface 17 of the housing 16.

The urging of the carriage 10 from the wider region 56 to the narrower region 58 of the through passage 54 pushes the clamping members 14 inwardly towards each other. This pushes the clamping surfaces 44 of the clamping members 14 into clamping engagement with the elongate article.

The urging arrangement 18 comprises a spring member 60 to urge the carriage 10 along the through passage 54, and a reaction member 62 to apply a reaction force to the spring member 60. In the embodiment shown, the spring member 60 is in the form of a coil spring, but it will be appreciated that the spring member 60 could be in the form of any other suitable spring.

The reaction member 62 comprises an inner portion 64 and a plurality of radially outwardly extending securing portions 66 attached to the inner portion 64. The plurality of securing portions 66 are arranged circumferentially around the inner portion 64.

The housing 16 has a cooperating formation 68 to cooperate with the securing portions 66, thereby securing the reaction member 62 to the housing 16. The cooperating formation 68 is in the form of an annular groove defined in the internal surface 17 of the housing 16 at the wider region 56 of the through passage 54.

The securing portions 66 are resiliently deformable to allow the securing portion 66 to cooperate with the cooperating formation 68. The securing portions 66 are received in the groove to secure the reaction member 62 to the housing 16. When so secured, the reaction member 62 can apply the reaction force to the spring member 60 to allow the spring member 60 to urge the carriage 10 along the through passage 54.

The inner portion 64 of the reaction member 62 defines a hole 70 through which the elongate article can extend. The reaction member 62 comprises an annular locating formation 72 that extends around the hole 70 in the inner portion 64. The locating formation 72 projects from the inner portion 64 to provide a projection received by one end region of the spring member 60 to locate the spring member 60 on the reaction member 62.

The carriage 10 further includes an annular seat formation 74 on which the spring member 60 can be seated. The seat formation 74 extends around the aperture 30 in the central portion 24, and projects from the central portion 24. The seat formation 74 is received by the opposite end region of the spring member 60.

The spring member 60 extends between the seat formation 74 of the carriage 10 and the locating formation 72 of the reaction member 62.

In use, when the holding portions 26 are in the open position, the clamping members 14 are arranged in the holding spaces 34 in an orientation in which the front end region 20 is directed away from the central portion 24, and the rear end region 22 faces towards the central portion 24. The holding portions 26 are then folded relative to the central portion 24 to the closed position. In the closed position, the front regions of the clamping members 14 are disposed over the central portion 24. When the carriage 10 is urged along the through passage 54, the front region of each clamping member 14 leads the rear region.

As the carriage 10 moves along the through passage 54, the holding portions 26 are pushed inwardly. This forces the clamping members 14 onto the elongate article, and the clamping surfaces 44 into clamping engagement with the elongate article.

The movement of the carriage 10 along the through passage 54 causes the supporting strips 48 of the holding portions 26, and the sliding surface 50 of each clamping member 14 to slide along the internal surface 17. Each supporting strip 48 is deformed by this sliding, thereby allowing the sliding surface 50 of each clamping member 14 to be pressed against the internal surface 17 of the housing 16 as the clamping surface 44 of each clamping member 14 is clamps the elongate article therebetween.

The housing 16 has a radially outwardly extending lip portion 78 on the body portion 52, at the wider region 56 of the through passage 54. The lip portion 78 is provided either to support an article on the clamping device 12 or to support the clamping device 12 on an article.

There is thus described a clamping device 12 and a carriage 10 for use in the clamping device 12. The carriage 10 allows three clamping members 14 to be installed in the holding members, and held in place in the housing 16 by the retaining formations, thereby preventing misalignment and the danger of the clamping members 14 falling out of the clamping device 12.

Various modifications can be made without departing from the scope of the invention. For example, the carriage may include any other suitable number of holding portions, for example, two or four.

The invention claimed is:

1. A clamping device comprising: a carriage, a plurality of clamping members, a housing and an urging arrangement, wherein the carriage is to hold the plurality of clamping members in the clamping device, the carriage comprising a central portion and a plurality of holding portions configured to hold the clamping members, each clamping member being held in a respective one of the holding portions, wherein the holding portions are foldable relative to the central portion between an open position of the holding portions and a closed position of the holding portions, wherein the carriage is housed in the housing when the holding portions are in the closed position, and wherein the urging arrangement is to urge the carriage along the housing.

2. The clamping device as claimed in claim 1, wherein in the open position, the holding portions extend radially outwardly from the central portion, and wherein in the closed position, the holding portions extend over the central portion.

3. The clamping device as claimed in claim 1, wherein the central portion defines an aperture through which an elongate article can extend, and wherein in the closed position, the holding portions define a central path therebetween for receiving the elongate article therethrough.

4. The clamping device as claimed in claim 1, wherein the holding portions are attached to the central portion by respective hinges.

5. The clamping device as claimed in claim 1, wherein each holding portion defines a holding space in which the respective clamping member can be received.

6. The clamping device as claimed in claim 5, wherein each holding space is elongate, and wherein each clamping member to be received in a respective holding space is elongate.

7. The clamping device as claimed in claim 5, wherein each holding portion has retaining formations to retain the clamping member in the holding space.

8. The clamping device as claimed in claim 7, wherein the retaining formations of each holding portion comprise a hook formation to hook over the clamping member.

9. The clamping device as claimed in claim 5, wherein each holding portion defines an insertion opening through which the clamping member can be inserted into the holding space, and wherein when the clamping member is in the holding space: a clamping surface of the clamping member faces outwardly through the insertion opening; or the clamping member projects from the holding space through the insertion opening with the clamping surface facing outwardly.

10. The clamping device as claimed in claim 9, wherein the clamping member has a sliding surface opposite the clamping surface, the sliding surface being slidable along a surface of the clamping device, such that in use, during clamping of the elongate article, the sliding surface can move along the surface of the clamping device.

11. The clamping device as claimed in claim 10, wherein each holding portion includes a supporting formation for supporting the clamping member in the holding space, wherein the, or each, supporting formation is deformable by the clamping member during clamping of the elongate article to allow the sliding surface to be clamped against the surface of the clamping device.

12. The clamping device as claimed in claim 1, wherein the carriage comprises a seat formation on which a spring member can be seated.

13. The clamping device as claimed in claim 1, wherein the holding portions are substantially equispaced around the central portion.

14. The clamping device as claimed in claim 1, wherein the housing defines a through passage along which the elongate article can extend, and wherein the carriage and the urging arrangement are disposed in the passage.

15. The clamping device as claimed in claim 14, wherein the housing has an internal surface defining the through passage, wherein the internal surface tapers from a wider region of the through passage to a narrower region of the through passage, and wherein the urging arrangement urges the carriage along the through passage from the wider region of the passage to the narrower region of the passage.

16. The clamping device as claimed in claim 15, wherein the urging of the carriage from the wider region to the narrower region of the through passage pushes the clamping members inwardly towards each other.

17. The clamping device as claimed in claim 1, wherein the urging arrangement comprises a spring member and a reaction member to apply a reaction force to the spring member.

18. The clamping device as claimed in claim 17, wherein the reaction member is secured to the housing, wherein the reaction member comprises a securing portion, and wherein the housing has a cooperating formation to cooperate with the securing portion, thereby securing the reaction member to the housing.

* * * * *